April 21, 1936.    A. RUDOLF    2,038,060

ELECTRIC BATTERY

Original Filed Sept. 29, 1932

INVENTOR:—
Artur Rudolf,
By Smith, Michael and Gardiner, Attorneys.

Patented Apr. 21, 1936

2,038,060

UNITED STATES PATENT OFFICE 2,038,060

ELECTRIC BATTERY

Artur Rudolf, Berlin, Germany, assignor to The Rulag Battery Company Limited, London, England Original application September 29, 1932, Serial No. 635,339. Divided and this application August 8, 1933, Serial No. 684,243. In Germany October 5, 1931

3 Claims. (Cl. 136—135)

The present invention is for improvements in or relating to electric batteries, and constitutes a division of my application Serial Number 635,339, filed September 29, 1932.

In connection with electric batteries and more especially lead cells, the difficulty has been experienced hitherto of leading the conductors which connect the electrodes to the external terminals of the battery, through a wall or lid of the cell in such a manner as to form a joint impervious to electrolyte. The "creep" of electrolyte occurs chiefly along the conductors of the positive electrodes and is probably due to the oxidation of the conductor by electro-chemical action, the oxide layer providing a path for the electrolyte.

One method frequently employed hitherto for sealing a conductor into the lid of a cell consists in pouring over the lid and around the terminals thereon, a substance which subsequently hardens. This method can only be employed, however, if the lid consists of rigid material to which the substance adheres firmly. Moreover, the conductor must be thoroughly dried and polished prior to adding the said substance which must be of considerable thickness, at least where it surrounds the conductor.

Such a method cannot be conveniently employed in the case of small lead cells, for example, for pocket lamps, where it is absolutely essential to prevent escape of acid and where the dimensions of the cell must be kept as small as possible.

It is an object of the present invention to provide an acid-proof joint between the wall of a cell and the conductor which connects an electrode to an external terminal.

According to the present invention there is provided a lead cell comprising a casing arranged to hold an electrolyte, an electrode arranged within the casing, a terminal arranged externally of the casing, and an electrical conductor arranged to connect the electrode to the external terminal characterized by the provision of means for preventing access of electrolyte to the conductor over the whole or a part of that portion of the conductor which extends from the surface of the electrolyte to the external terminal. Preferably the means for preventing access of the electrolyte to the conductor comprises a covering member which adheres firmly to the conductor and is sealed through the wall of the cell container in an airtight and acid-proof manner.

With this arrangement chemical action can proceed only on those portions of the conductor, which are located inside the cell and are not covered by the protecting envelope. Since a portion of the conductor must be soldered or otherwise secured to the electrode, it will be inconvenient to cover the conductor over its entire length, but the length of covered conductor can be so chosen without considerable increase in space, that it is practically impossible for chemical action to proceed under the protective covering a sufficient distance to reach the terminal.

A convenient length of the conductor may be obtained by providing a helix thereof between the point where it enters the cell and the electrode, the helical portion being covered with the protecting envelope in accordance with the invention. Other methods of ensuring that the chemical action does not proceed as far as the external electrode will be hereinafter described.

When applying the protecting cover to the conductor it is essential that the protecting cover which consists of acid-proof material, should adhere closely to the conductor. The latter must therefore be as clean and polished as possible. There are a number of acid-proof materials which may be employed for forming the protective covering. The most convenient material is celluloid which is preferably applied to the conductor in the form of a thin seamless film of celluloid varnish. Any other suitable material, such as artificial resin and the like, may be employed instead of celluloid and may be applied either by spraying or by pressing a thin film of the material on to the conductor.

It is, in many cases, difficult to apply to the conducting tags of the plate a protecting cover which adheres perfectly thereto. In such cases, it is proposed in accordance with a further feature of the invention to make the conductor from the electrode to the external terminal of the cell in two or more conducting parts, namely an outer conductor and an inner conductor. The outer conductor extends through the cell wall and is connected to an external terminal of the cell, whilst the inner conductor connects the outer conductor to the electrode tag. Both conductors, or at least the outer conductor are provided with a protecting cover according to the invention. The inner conductor may be connected to the electrode tag by soldering. A conductor comprising two or more conducting parts, one or more of which are enveloped wholly or in part in a protecting cover, has the advantage that, when the cell is built up from charged acid-damp plates, the protected part of the conductor, can be placed in the container and the protecting cover thereof sealed to the wall of the cell in a liquid tight manner before the container comes into contact with acid.

It is also possible to protect the conductor or one or more parts thereof against the action of the electrolyte by embedding these parts for a sufficient distance in the wall of the container which, thereby acts as a closely fitting protecting cover for the conductor. This method is particularly well suited in cases where the conductor consists of several parts as it is then possible to embed a part of the conductor in the wall of the container at the time of constructing the wall, which may be effected by casting, pressure or spraying.

Although, as a rule, the positive conductor is more subject to chemical action than the negative, it has nevertheless been proved to be of advantage, to construct the conductors of the negative as well as of the positive plates according to the invention, and they may then be arranged in the cell in such a manner, that they rest between the plates, and serve as separators therefor.

The invention will be more particularly described with reference to the accompanying drawing, in which:—

Figure 1:
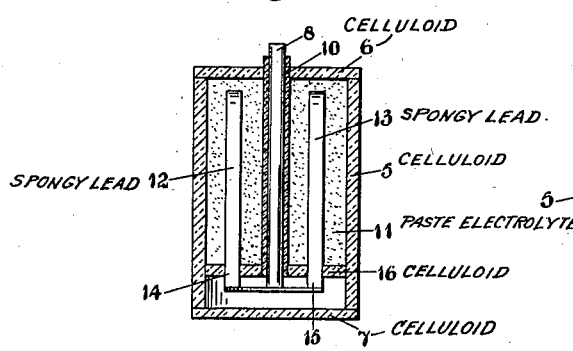
Figure 1 is a vertical section on an enlarged scale of a battery for a pocket lamp constructed in accordance with the invention and taken on the line 1—1 of Figure 2, Figures 2 and 3 are end and side elevations respectively of the battery shown in Figure 1, a portion of the casing being broken away in Figure 3 to illustrate the internal construction of the battery.
Figure 3:
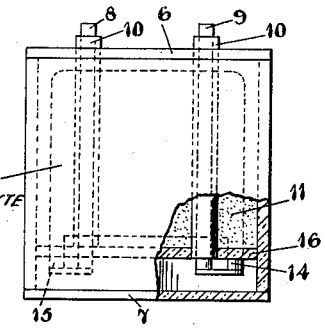

Referring to the drawing, a battery comprises a four-sided celluloid casing 5 having two end celluloid walls 6 and 7 which are subsequently secured to the shell by means of an adhesive in such a manner that the casing is rendered gas-tight.

Prior to securing the end wall 6 in position, there are introduced through two holes therein, two lead conductors 8 and 9 which have been previously coated for the major portion of their length with a covering of celluloid 10. The conductors 8 and 9 are of such a length that when introduced into the shell they extend beyond the other end thereof and are at the same time arranged to form a liquid tight joint with the end cover 6. The end cover 6 when placed in position is cemented to the side walls of the casing so as to form a liquid tight joint therewith. The cup shaped member formed by the shell 5 and the end cover 6 is thereupon filled with an electrolyte 11 of paste-like consistency and the positive and the negative electrodes 12 and 13 which are preferably constructed in accordance with the invention claimed in United States patent application Serial No. 635,339 are introduced into the said cups so that the lugs 14 or 15 thereof extend from the open end of the cup in a like manner to the conductors 8 and 9 above referred to. A second end cover 16 formed of a piece of celluloid having a series of holes therein is then threaded over the conductors 8 and 9 and the lugs 14 and 15 are thereupon cemented to the side walls of the shell. The ends of the lugs 14 and 15 and the conductors 8 and 9 are connected to one another by means of lead burning, the lugs 14 being connected to the conductors 9 whilst the lugs 15 of the negative electrode are connected to the conductor 8, the conductors so united are thereupon pressed into the false bottom of the shell which is covered by the end cover 7 which is cemented upon the open end of the casing so as to form the true bottom of the finished shell.

Figure 4:
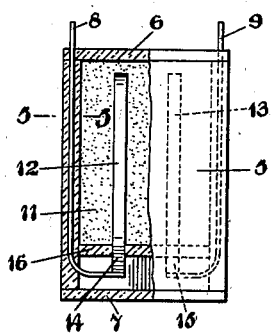
Figure 4 is a side elevation partly in section illustrating a modified form of battery constructed in accordance with this invention in which the conductors are embedded or moulded in the side wall of the casing.
Figure 2:
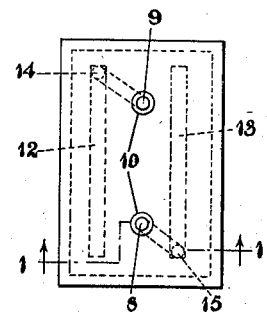
Figure 5:
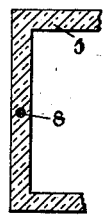
Figure 5 is a sectional view on the line 5—5 of Figure 1.
Figure 6:
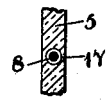
Figure 6 is a view similar to Figure 5, illustrating a modified construction in which the conductors extend through a bore or channel blown or otherwise formed in the side wall of the casing.

Instead of introducing the lead conductors 8 and 9 through the end cover 6 of the casing, they may, if necessary, be moulded into the side walls of the shell as is shown in Figures 4 and 5, or they may be introduced through holes 17 blown in the direction of the length of the wall of the shell as shown in Figure 6 so as to ensure in both cases that the conductors are protected from the electrolyte for the major portion of their length as they extend from the "top" to the "bottom" of the cell.

It is well known that when charging lead cells, gases are formed which, in the usual lead-accumulators escape through a hole specially provided therefor in the wall of the cell. On the other hand, if a cell is not intended to be recharged it may, in addition to being constructed as described above be made gas-tight and acid-tight, so that it is impossible to re-open the cell without destroying the container. The purpose of this is to remove all possibility of the electrolyte escaping, but it has also been demonstrated that the gas-tight closing of the inside of the cell against the atmosphere has a marked influence on the shelf-life of such cells. By this means water is prevented from evaporating from the thickened electrolyte and the oxygen of the air cannot reach the plates through fissures in the electrolyte.

Further, it has also been found that, in lead cells such as have been described above which are used only once, it is preferable to use plates, which are made by compression, for example, according to United States Patent application Serial No. 635,339. As such plates have no special lead carrier-frame, it is possible to increase the capacity of the cell in comparison with the weight thereof but it also ensures that there is no lead on the surface of the plates and consequently improves the storing properties of the cell.

What I claim and desire to secure by Letters Patent of the United States is:—

1. A lead cell which comprises in combination, a casing arranged to hold an electrolyte, at least one positive and one negative electrode arranged within said casing in spaced relation, and at least one conductor for the positive electrode and at least one corresponding conductor for the negative electrode, each of said conductors extending internally and externally of the casing to form the respective electrical connections for the positive and negative electrodes, said conductors each being provided within the casing with a protective covering of acid resisting insulating material arranged to prevent direct contact between the electrolyte and said conductors to preclude creeping of the electrolyte to the external portions of said conductors, the insulated portion of at least one of said conductors extending between two adjacent positive and negative electrodes from the point of connection to an electrode toward a remote end thereof to maintain the said electrodes spaced by the thickness of the conductor throughout the major portion of their length, the whole of that portion of any conductor which is protected by said covering of insulating material being immune to the action of the electrolyte whereby to act as a separator for the electrodes.

2. A lead cell which comprises in combination a casing arranged to hold an electrolyte, at least one positive and one negative electrode arranged in spaced relation within said casing, and at least one conductor for the positive electrode and at least one corresponding conductor for the negative electrode, each of said conductors extending internally and externally of the casing and being of a length equal at least to the length of one of said electrodes, each of said conductors being connected to that end of the corresponding electrode which is remote from that portion of the casing from which the corresponding conductor extends, said conductors being each provided within the casing with a protecting covering of acid resisting insulating material arranged to prevent direct contact between said conductors and the electrolyte to preclude creeping of the electrolyte to the external portions of the conductors, the insulated portion of at least one of said conductors extending between two adjacent positive and negative electrodes from the point of connection to an electrode toward the opposite end thereof to maintain the said electrodes spaced a distance not less than the thickness of said conductors, the whole of that portion of any conductor which is protected by said covering of insulating material being immune to the action of the electrolyte whereby to act as a separator for the electrodes.

3. A lead cell comprising in combination a casing arranged to hold an electrolyte, at least one positive and at least one negative electrode arranged within the casing in spaced relation, and at least one conductor for the positive electrode and at least one conductor for the negative electrode, said casing including outer cover members at opposite ends thereof and an inner false cover member arranged in spaced relation to one of said outer cover members and defining therewith a compartment within the casing, each of said conductors including two portions, one portion of each conductor being connected to the respective electrodes and lying within said compartment, the other portion of each electrode being connected to said first portion within said compartment and extending therefrom through said inner false cover member, through that portion of the casing occupied by the electrolyte and between two adjacent positive and negative electrodes and thence extending exteriorly of the casing through the outer end cover member remote from said compartment, the portions of the conductors passing through the electrolyte being provided with protecting sheaths of acid resisting insulating material to prevent the electrolyte from creeping to the exterior portions of the conductors and to maintain said electrodes out of contact with each other.

ARTUR RUDOLF.